S. M. LAMPKE.
DEVICE FOR DISTRIBUTING ASHES AND SAND.
APPLICATION FILED MAY 24, 1910.
991,790.
Patented May 9, 1911.
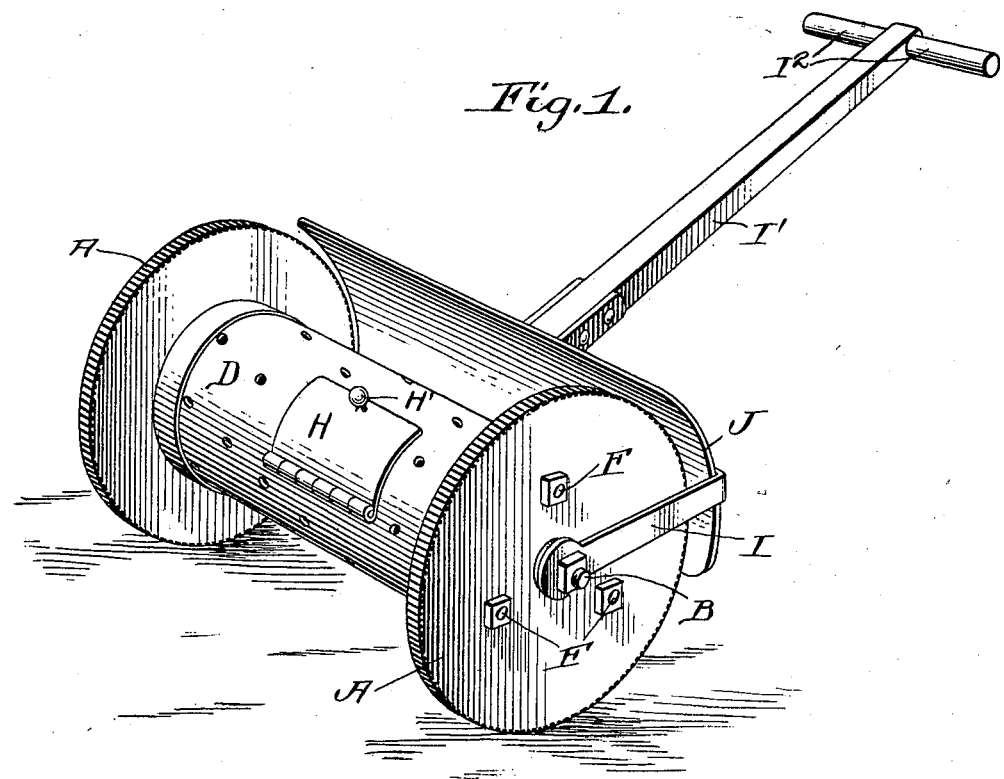
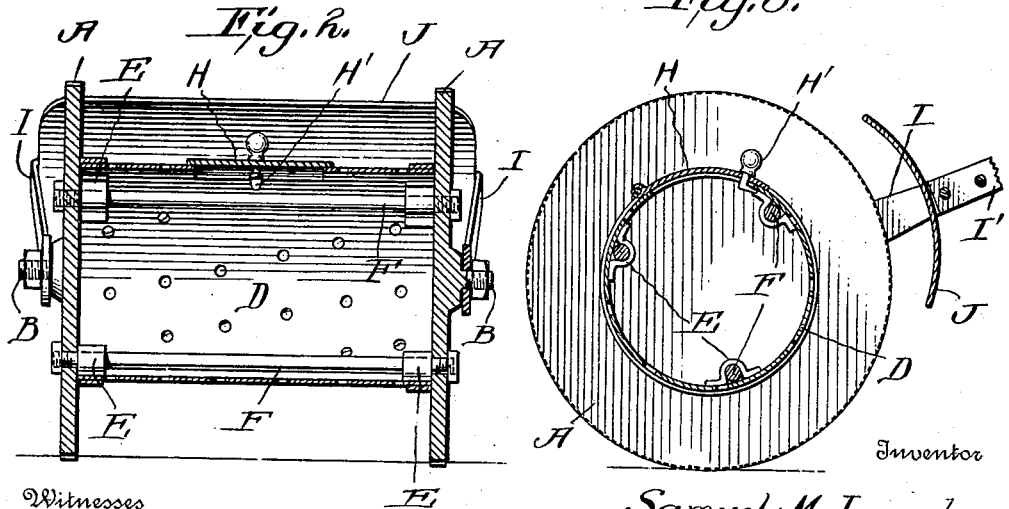
Witnesses
Oliver W. Holmes
Q. P. Wright
Inventor
Samuel M. Lampke,
By Chas. E. Brock
Attorney

UNITED STATES PATENT OFFICE.

SAMUEL M. LAMPKE, OF DETROIT, MICHIGAN.

DEVICE FOR DISTRIBUTING ASHES AND SAND.

991,790.     Specification of Letters Patent.     Patented May 9, 1911.

Application filed May 24, 1910. Serial No. 563,221.

*To all whom it may concern:*

Be it known that I, SAMUEL M. LAMPKE, a citizen of the United States, residing at Detroit, in the county of Wayne and State of Michigan, have invented a new and useful Improvement in Devices for Distributing Ashes and Sand, of which the following is a specification.

This invention relates to a device for distributing ashes, sand, salt or any other suitable material on icy sidewalks, the object being to provide a device whereby the sidewalk can be sprinkled with a substance to prevent people from slipping.

Another object of my invention is to provide a device which is exceedingly cheap and simple in construction and one in which the parts are so connected that the same is not likely to get out of order while in use.

A still further object of my invention is to provide a device which can be pushed easily and one in which the substance to be distributed will pass out of the same in a powdered condition, so that the ice covered surface will be completely covered.

Another object of my invention is to provide an apron for the device for preventing the dust from flying rearwardly when in operation, thereby protecting the operator from the dust and dirt.

With these and other objects in view, the invention consists in the novel features of construction, combination and arrangement of parts, hereinafter fully described and pointed out in the claims.

In the drawing forming a part of this specification: Figure 1 is a perspective view of my improved device. Fig. 2 is a transverse section through the same. Fig. 3 is a longitudinal section.

In carrying out my improved invention, I employ a pair of wheels A having outwardly projecting journals B, and provided with notched or roughened peripheries as clearly shown, for preventing the wheels from slipping when traveling over an icy surface.

Arranged between the wheels A is a perforated drum D, provided with sleeves E at its ends, through which bolts F are adapted to pass which extend through openings formed in the wheels for locking the drum between the same, and said drum is provided with a hinged door H, fastened by a latch H', through which the material to be distributed is inserted, and it will be seen that when the drum is secured in position between the wheels, they will be held firmly in position, and are of such a size that the periphery of the drum will be above the surface of the ground, so that the material within the drum will be sprinkled as the same is moved.

Mounted on the ends of the journals B, are angled handle frames I which are secured in position by nuts and carry a handle I' which is provided with hand grips I² at its end, which is adapted to be gripped by the operator so that the device can be pushed easily over an ice covered surface.

For protecting the operator from the dust caused by the material within the drum passing out through the opening, I provide a handle frame I with a curved apron J which is of such a size that the lower edge will be held a slight distance above the surface, when the device is in operation.

From the foregoing description it will be seen that by providing a device as described, ashes, sand, salt or any other substance can be placed within the drum and distributed over the surface in such a manner that the difficulties now existing in accomplishing this result will be greatly facilitated.

Having thus fully described my invention, what I claim as new and desire to secure by Letters Patent is:—

1. A device for distributing ashes and sand, comprising a pair of wheels having outwardly projecting journals, a perforated drum arranged between said wheels and carried thereby, a handle frame pivotally mounted on said journals, a handle carried by said frame and a curved apron carried by said handle frame having a length greater than the distance between said wheels.

2. As a new article of manufacture, an ash distributer comprising a pair of wheels provided with journals, a cylinder secured between said wheels by bolts passing longitudinally through said cylinder and wheels, said cylinder being provided with perforations and a hinged door, a handle frame pivotally mounted on the journals of said wheels, and a curved apron carried by said handle frame to the rear of said wheels.

3. A device of the kind described comprising a pair of wheels having outwardly projecting journals, of a perforated drum arranged between said wheels provided with sleeves, bolts passing through said wheels and sleeves for securing said drum between said wheels, handle frames mounted on the ends of said journals carrying a handle, and a curved apron carried by said handle frame.

4. A device of the kind described comprising a pair of wheels having outwardly projecting journals, of a perforated drum provided with a door arranged between said wheels, sleeves carried by the inner sides of said drum, bolts extending through said wheels and sleeves, handle frames mounted on the ends of said journals, nuts for securing said handle frames, a handle carried by said handle frame having grips at its end, and a curved apron carried by said handle frames.

SAMUEL M. LAMPKE.

Witnesses:
HARRY M. BAXTER,
J. D. SMITH.

Copies of this patent may be obtained for five cents each, by addressing the "Commissioner of Patents, Washington, D. C."